United States Patent [19]
Descombes et al.

[11] Patent Number: 5,959,369
[45] Date of Patent: Sep. 28, 1999

[54] BATTERY OPERATED APPARATUS

[75] Inventors: Arthur Descombes, Kerzers; Marcel Bruelhart, Cudrefin, both of Switzerland

[73] Assignee: EM Microelectronic-Marin SA, Marin, Switzerland

[21] Appl. No.: 09/070,791

[22] Filed: May 1, 1998

[30] Foreign Application Priority Data

May 2, 1997 [CH] Switzerland .......................... 1033/97

[51] Int. Cl.⁶ .................................................. H02J 7/00
[52] U.S. Cl. ............................ 307/48; 307/44; 307/150; 320/128; 320/137; 320/166
[58] Field of Search ................................. 307/18, 44, 48, 307/64, 66; 417/63; 320/137, 166, DIG. 22, 112, 128; 136/291; 340/455

[56] References Cited

U.S. PATENT DOCUMENTS

| | | | |
|---|---|---|---|
| 3,634,842 | 1/1972 | Niedermeyer | 417/63 |
| 3,921,049 | 11/1975 | Mellors et al. | 320/137 |
| 3,970,912 | 7/1976 | Hoffman | 320/DIG. 2 |
| 4,220,872 | 9/1980 | Fahey . | |
| 4,531,083 | 7/1985 | Hoffman | 320/128 |
| 4,612,492 | 9/1986 | Burk | 320/128 |
| 4,639,656 | 1/1987 | Mukai . | |
| 5,387,858 | 2/1995 | Bender et al. | 320/101 |

*Primary Examiner*—Albert W. Paladini
*Attorney, Agent, or Firm*—Sughrue, Mion, Zinn, Macpeak & Seas, PLLC

[57] ABSTRACT

An apparatus equipped with a battery, such as an electrical toothbrush, receives from a charging device a charging voltage which adapts to the charged condition of the battery and on whose over-discharging is correspondingly small. On the one hand the apparatus comprises a series circuit between a capacitor and a diode which is connected to the charging device parallel to the battery, wherein the diode is arranged in the forward direction. On the other hand in series to the battery there is arranged an electronic switch which periodically for a short time interrupts the charging procedure of the battery. In each case during such an interruption the charging apparatus is unloaded and its voltage increases jump-like by which means the capacitor can be charged via the diode. In each case with a closed switch, i.e. on loading the charging apparatus by the battery, the capacitor supplies a further relatively high impedance load so that this independently of the value of the charging voltage may be supplied with a sufficiently high and constant voltage.

14 Claims, 2 Drawing Sheets

5,959,369

BATTERY OPERATED APPARATUS

BACKGROUND OF THE INVENTION

The invention relates to an apparatus operated by a rechargeable battery, according to the introductory part of claim 1.

This apparatus may for example be an apparatus operated independently of the mains such as a toothcare apparatus, in particular an electrical toothbrush, a shaving apparatus, a haircare apparatus, a telephone, a small kitchen utensil or likewise.

In DE 40 22 642 there is for example shown a battery operated electrical toothbrush as well as the associated charging apparatus, wherein the latter comprises means for the symmetrical limitation of the output alternating voltage in order to reduce the susceptibility to corrosion of the connection contacts between the charging apparatus and the toothbrush. The toothbrush merely comprises a battery, a motor for driving the brush, a switch for switching the motor on or off as well as a diode.

With CH 656 987 on the other hand there is a contact-free transmission from the stationary charging apparatus to the hand apparatus, wherein the charging apparatus comprises a supply for producing a high frequency alternating voltage, whilst the hand apparatus in turn is simply constructed and apart from a secondary winding and a battery only comprises rectifier and zener diodes.

With both solutions the charging apparatus of the toothbrush for the charging of the battery makes available a voltage which adapts to the charged condition of the battery, i.e. the battery reduces the charging voltage. The charging voltage is lower, the less cells the battery comprises, the lower the nominal cell voltage and the more heavily the battery is discharged. For example the charging voltage of an already charged NiCd cell is about 1.5 V, whilst in the heavily discharged condition may sink to below 0.5 V.

In the case that the toothcare apparatus of the above mentioned documents are for example are equipped with only one battery cell, on charging accordingly also only a small voltage is available. In both cases there is therefore no possibility, apart from the battery, of supplying a further load, for example an electronic circuit, with an adequately high and at least approximately constant voltage. For example it is hardly possible at all to provide these toothcare apparatus with a charging display circuit, since the necessary supply voltage during the charging procedure is not available.

BRIEF SUMMARY OF THE INVENTION

It is therefore the object of the present invention to provide additional loads with a sufficiently high and constant supply voltage, in particular also during the charging procedure of the battery.

The solution according to the invention of this object results from the features of claim 1.

Advantageous embodiment forms are to be deduced from the dependent claims.

The apparatus according to the invention, with respect to the state of the art, has the advantage that during the charging procedure, apart from the battery to be charged, which from the point of view of the supply represents a low impedance load, a high impedance second load can be supplied with a constant and sufficiently high voltage.

On the one hand this is achieved in that a diode and a capacitor form a series circuit which lies at the voltage delivered by the charging device, wherein the diode is arranged in the forward direction, and on the other hand by way of the fact that an electronic switch alternately for a short period interrupts the charging procedure of the battery in order to unload the charging device, to let its voltage increase and to charge the capacitor. The diode protects the capacitor from discharging by the battery or the charging device.

The solution according to the invention permits in a very economical manner the supply of current to a further load which is high impedance compared to the battery. Of course also several loads may be fed by the capacitor. The capacitor is amongst other things to be designed such that the voltage during its discharging, i.e. during the charging period of the battery, only falls in allowable limits. Further the charging time of the capacitor and likewise the number of charging periods per unit of time may be varied. Corresponding computations for determining the capacitance of the capacitor as well as the switching times t1 and t2 belong to the usual field of activity of the man skilled in the art and therefore do not need to be explained.

BRIEF DESCRIPTION OF THE DRAWINGS

The invention is hereinafter described in the sense of an example which does not exclude others, by way of an electrical toothbrush, wherein the drawings are referred to. There are shown.

DETAILED DESCRIPTION OF THE INVENTION

Figure 1:
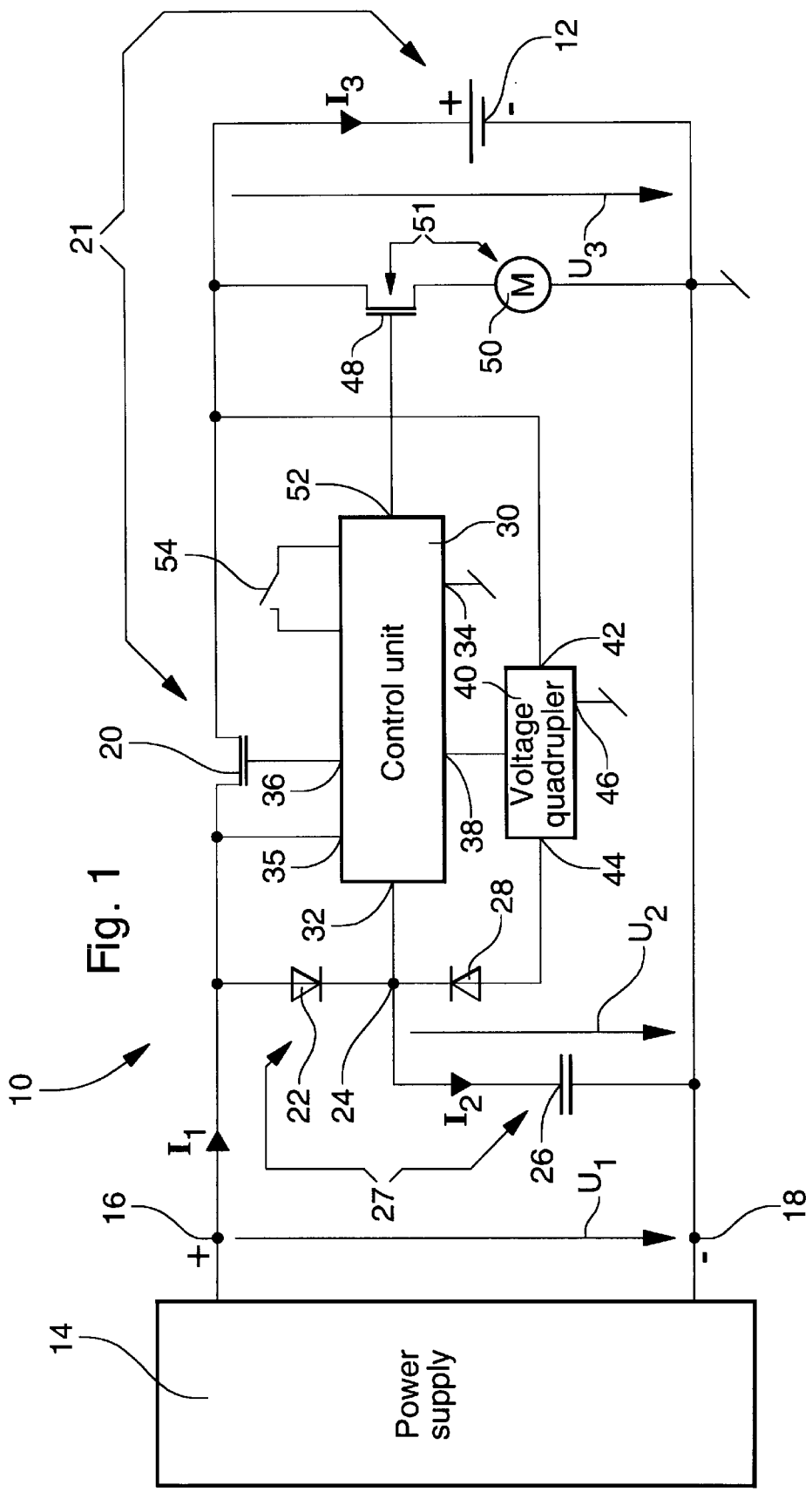
FIG. 1 a simplified, electrical sketch of an electrical toothbrush according to the invention, operated by a rechargeable battery and FIG. 2 various voltage courses of the toothbrush according to the invention of FIG. 1.

In FIG. 1 a battery operated apparatus according to the invention in the form of an electrical toothbrush 10 with a battery 12 consisting of a cell is shown. To the electrical toothbrush 10 there is allocated a mains-supplied charging device which in FIG. 1 is only shown by an electrical energy source indicated with a supply 14. Not shown are amongst other things the mains connections as well as transmitting means between the charging apparatus and the toothbrush, be this in the form of plug contacts as in DE 40 22 642 or by way of inductive transmission as in CH 656 987.

The supply 14 is at least at times essentially able to be driven as a current source, comprises a suitable high impedance internal resistance and delivers a load-dependent charging voltage U1 as well as a charging current I1 to the toothbrush, wherein the charging voltage U1 in the toothbrush lies between a positive 16 and a negative point 18. The charging voltage U1 corresponds to a DC voltage whose course is constant or may be variable, i.e. uniform or non-uniform. For example it may also have a sine half-wave shape.

The positive point 16 leads to the drain connection of a MOS field effect transistor 20 for switching on or off the charging procedure, whose source connection further leads to the positive connection of the battery 12. The negative connection of the battery 12 is connected to the negative point 18 of the supply 14. The drain-source path of the MOS field effect transistor 20, with the battery 12 forms a series circuit 21.

The battery 12 comprises a DC voltage which is indicated with a battery voltage U3 and comprises from the point of view of the supply 14 a low impedance first load.

The positive point 16 is furthermore connected to the anode of a diode 22 whose cathode leads to a node 24. Connected to this node 24 are the one connection of a capacitor 26 as well as the cathode of a further diode 28. The other connection of the capacitor 26 is connected to the negative point 18. The diode 22 and the capacitor 26 thus form a series circuit indicated at 27. Over the capacitor 26 or between the node 24 and the negative point 18 there lies a DC voltage which is indicated as a capacitor voltage U2. The charging or discharging current of the capacitor 26 is indicated at I2.

Further a control unit 30 is connected via its positive supply input 32 to the node 24, whilst its negative supply voltage 34 leads to the negative point 18. The control unit 30 comprises an input 35 which is connected to the positive point 16 as well as an output 36 which is connected on the gate connection of the MOS field effect transistor 20. A further output 38 is connected to a voltage quadruplet 40.

This voltage quadrupler 40 on the one side comprises an input 42 which leads to the positive connection of the battery 12, as well as an output 44 which is connected to the anode of the diode 28. Also the voltage quadrupler 40 is connected to the negative point 18 via a negative supply input 46.

Parallel to the positive and to the negative connection of the battery 12 there is arranged a series circuit 51 which comprises a MOS field effect transistor 48 and a motor 50, i.e. the drain connection of the MOS field effect transistor 48 is connected to the positive connection of the battery 12, its source connection leads to the one connection of the motor 50 and the other connection of the motor 50 is connected to the negative point 18 of the supply 14. The charging or discharging current of the battery 12 is indicated at I3.

The gate connection of the MOS field effect transistor 48 leads to an output 52 of the control unit 30. Further a switch 54 for starting the motor 50 is connected to the control unit 30, which in the following is called a motor switch.

The control unit 30 comprises various components which are not represented in FIG. 1. For example there is provided a capacitance counter which discloses the charging condition of the battery 12. Likewise not shown are two voltage doublers which serve the triggering of the gates of the two MOS field effect transistors 20 and 48 respectively and whose outputs correspond to the outputs 36 and 52 respectively of the control unit 30. Further the control unit 30 has at its disposal a time base which controls the through-switching and blocking of the MOS field effect transistor 20.

Figure 2:
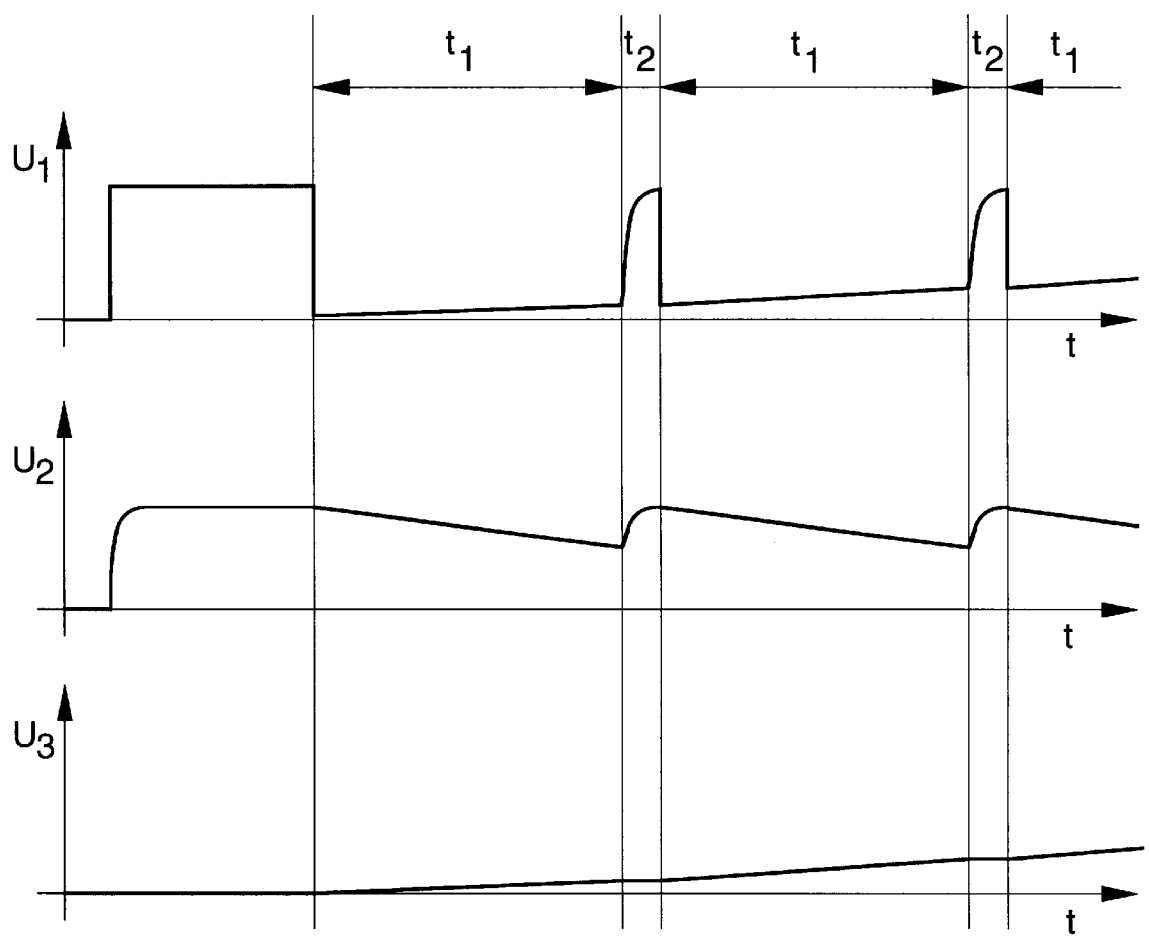

The now following description of the functioning manner of the toothbrush 10 according to the invention is made with reference to FIGS. 1 and 2 and concerns the following initial situation, wherein here all details are only to be understood within the meaning of an example:

the toothbrush 10 is located in the charging apparatus,
the motor switch 54 is not actuated,
the battery 12 is completely discharged,
the capacitor 26 is completely discharged,
the MOS field effect transistor 20 is located in the blocking condition and
the MOS field effect transistor 48 is located in the blocking condition.

The supply produces internally a no-load voltage of 9 V, but a zener diode not shown in FIG. 1 limits the supply voltage to 6.8 V. Since the diode 22 is poled in the forward direction the capacitor 26 is charged so that the capacitor voltage U2 at the node 24 rises from 0 V to roughly 5 V. By way of this the positive supply input 32 in the shortest time lies at a sufficiently high supply voltage and the control unit 30 may assume its function. The capacitor voltage U2 is due to the relatively high switching frequency of the MOS field effect transistor 20, U1 and the capacitance of the diode 22 more than 0.7 V, i.e. almost 2 V lower than the supply voltage U1, wherein here average values are assumed.

The control unit 30 triggers the MOS field effect transistor 20 via the output 36 with a relatively high voltage of about 10 V in order to achieve a small drain-source forward resistance $R_{DSon}$ of about 1.5 Ohms. The voltage of 10 V which is roughly double as high as the capacitor voltage U2 is produced by the already mentioned but not shown voltage doubler of the control unit 30.

As long as the battery voltage U3 does not exceed 0.7 V, a start-up of the motor 50 released by actuating the motor switch 54 remains blocked.

The now conducting MOS field effect transistor 20 sets the charging procedure of the battery 12 in motion, wherein the accumulator charging current I3 of the supply is roughly 200 mA, at the MOS field effect transistor 20 a fall in voltage of roughly 0.3 V arises and the supply voltage U1 is almost completely dragged under. Since the capacitor voltage U2 of the node 24 markedly exceeds the supply voltage U1, the diode 22 is now located in the blocking poling and prevents the discharging of the capacitor 26 via the battery 12.

The capacitor 26 supplies the control unit 30 and at the same time is discharged, wherein its capacitance is dimensioned such that the capacitor voltage U2 falls depending on the prevailing input resistance of the positive supply input only within allowable limits, as can be seen from the U2 course of FIG. 2. An unhindered functioning of the control unit 30 is guaranteed up to a voltage of 1.2 V.

By way of the time base contained in the control unit 30 the MOS field effect transistor 20 200 ms after switching on is again switched off and thus the charging procedure of the battery 12 is interrupted. The switching-on duration of the MOS field effect transistor 20 of 200 ms is indicated as time interval t1, as is deduced from FIG. 2. By way of the unloading of the supply 14 the supply voltage U1 shoots back to 6.8 V and the charging procedure of the capacitor 26 via the diode 22 is again applied. The time base of the control unit 30 limits the charging duration of the capacitor 26 to 2 ms. This time duration is called time interval t2, as can likewise be deduced from FIG. 2.

Subsequently the control unit 30 triggers the MOS field effect transistor 20 in order to again effect the assumption of the interrupted charging procedure of the battery 12 for the duration of the time interval t1. After the completion of time interval t1 there follows in turn during the time duration t2 the covering of the charging losses of the capacitor 26 incurred in the meantime.

The charging procedure of the battery 12 during t1 and the charging procedure of the capacitor during t2 continuously alternate, wherein trials have shown that the short charging interruptions of the accumulator 12 have no negative effect on its capacitance, the life expectancy or other variables.

This compensation of the charging of the capacitor 12 carried out periodically is called "refreshing" by the applicant, since the charging condition is to a certain extent freshened up and forms one of the central points of the present invention.

In FIG. 2 the rise of the charging voltage U1 is shown in an exaggerated measure so that with an increasing battery voltage U3 it becomes clear that the charging voltage U1 is not dragged under as strongly.

Of course the time interval t1 is to be valued such that the capacitor voltage U2 by far does not fall to the minimal allowable 1.2 V. Also the time interval t2 must be sufficiently large in order in each case to permit a complete charging of the capacitor 26. With a capacitance of 4 μF of the capacitor 26 a critical capacitor voltage U2 is only achieved after ten seconds.

The charging condition of the battery 12 is indirectly determined by the control unit 30 in that the condition of the capacitance counter incremented on charging and decremented on discharging is enquired.

Since there is a danger that the condition of the capacitance counter does not exactly correspond to the actual charging condition of the capacitor 12, for example because the user loads the motor 50 more heavily than originally assumed, after each discharging procedure a slight overcharging of the battery 12 is provided. This slight overcharging is achieved in that the capacitance counter as a rule always assumes a large discharging current I3, even when the motor 50 is hardly loaded. At the same time the charging current I3 is dimensioned such that the battery 12 on overloading does not undergo any damage. A charging current I3 of 100 mA is for example thoroughly allowable. At the same time also no gradually occurring capacitance loss of the capacitor occurs.

Up to now it has been assumed that the electrical toothbrush is located constantly in the stationary charging apparatus not shown in FIG. 1 and the supply is connected to the mains in an energy transmitting manner via a transformer.

For the following description it is now assumed that the battery 12 with a removal of the electrical toothbrush 10 from the charging apparatus is already completely charged and the MOS field effect transistor 20 is located in the blocking condition. The control unit registers via the input 35, that the supply voltage U1 has fallen away and via the output 38 sets the voltage quadruplet 40, also known as a voltage pump, in operation.

The voltage quadrupler 40 quadruples the battery voltage U3 lying at its input 42 from 1.45 V to a voltage of 5.8 V which is outputted via its output 44 to the node 24, i.e. to the positive supply input 32 of the control unit 30. This feeding back of the voltage is necessary since the compensation of the discharging of the capacitor 26 as mentioned is no longer effected by the supply 14.

If the user actuates the motor switch 54 the control unit 30 by way of the voltage doubler not shown in FIG. 1 via the output 52 switches on the MOS field effect transistor 48 by which means the discharging of the battery 12 sets in via the motor 50.

With a battery voltage U3 of 0.7 V the voltage quadruplet 40 produces at its output 44 2.8 V, of which 0.7 V falls away over the diode 28, so that the control unit 30 is supplied with a voltage U2 of 2.1 V. With a voltage U2 of 2.1 V the two voltage doublers of the control unit 30, which are not shown, still produce at the gates of the MOS field effect transistors 20 and 48 somewhat more than 4 V, by which means there is still ensured a satisfactory low drain-source passage resistance $R_{DSon}$ of below 3 Ohms.

If the electrical toothbrush 10 for a longer time is not located in the charging apparatus and the self discharging continues, the function of the control unit 30 may be maintained up to a battery voltage U3 of 0.45 V since the voltage quadrupler in this case at its output 44 still produces 1.8 V of which 0.6 V falls away over the diode 28 so that the control unit 30 is supplied with the smallest allowable voltage of about 1.2 V.

Should the user block the motor 50, the control unit 30 switches off the MOS field effect transistor 48 automatically after 4 seconds.

For the purpose of limiting the charging current I2 of the capacitor 26 it may be useful to provide a resistance in series with the latter.

In any case a direct connection between the battery 12 and the control unit 30 may be provided so that the latter may directly monitor the charging condition.

Of course to the series circuit 27 between the capacitor 26 and the diode 22 there may be added a further element such as a resistance for limiting the charging current of the capacitor 26.

Although in FIG. 1 the positive point 16 leads to the diode 22 it is for example also possible that the point 16 is connected directly to the one connection of the capacitor 26 whilst its other leads to the anode of the diode 22, whose cathode is connected to the negative point 18. The load fed by the capacitor, in FIG. 1 the control device 30, is only to be connected parallel to this capacitor, i.e. between the positive point 16 and the node arranged between the capacitor and the diode.

As a rule apart from NiCd also any battery or cell type may be applied.

Although in the example shown only one battery cell has been assumed, the solution according to the invention may also be applied to a battery with several cells. It is critical how heavily the battery in the heavily discharged state drags under the voltage delivered by the charging apparatus and whether this voltage is then sufficient in order to reliably feed a further load. Since the total voltage of several cells in the condition of over-discharging can be very small and may no longer be adequate for supplying an electronic circuit, the application of the solution according to the invention is here equally advantageous. Since the total voltage of a battery with numerous cells in the condition of complete discharge may be zero, the solution according to the invention is very advantageous independent of the number of cells.

Of fundamental importance are the function of the capacitor as a short time energy store, the diode as a means for the protection from undesired discharging of the capacitor and the cyclical temporary interruption of the battery charging procedure for the purpose of unloading the charging device which comprises a relatively high internal resistance.

What is claimed is:

1. A battery operated apparatus with a battery consisting of at least one cell, wherein to the apparatus there is allocated a charging device with an electrical energy source which in the apparatus between two points at least at times produces a load-dependent voltage, and the battery for the electrical energy source forms a first load, wherein the battery with a first switch means forms a first series circuit which is arranged between the points a rectifier element and a capacitor form a second series circuit which likewise is arranged between the two points, wherein the rectifier element with respect to the voltage is arranged in the forward direction and between the rectifier element and the capacitor there is defined a node, a second load which has a higher impedance with respect to the first load is in contact with the node and at least one of the points and there is provided a control means for the cyclical switching of the first switch means in order to alternately permit in the switched on condition the charging procedure of the battery and in the switched off condition the charging procedure of the capacitor.

2. A battery operated apparatus according to claim 1, wherein the second load forms an electronic circuit, whose first supply connection is connected to the node and whose second supply connection is connected to a first of the two points.

3. A battery operated apparatus according to claim 2, wherein with respect to the voltage U1 the first point has a negative potential and a second of these points has a positive potential and the rectifier element comprises a diode, whose anode is connected to the first point and whose cathode is connected to the node.

4. A battery operated apparatus according to claim 1, 2 or 3, wherein a third load with a second switch means forms a third series circuit which is connected to the battery.

5. A battery operated apparatus according to claim 4, wherein the third load is a motor.

6. A battery operated apparatus according to claim 1, wherein the first and the second switch means are MOS field effect transistors.

7. A battery operated apparatus according to claim 1, wherein the battery only comprises one cell.

8. A battery operated apparatus according to claim 1, wherein the charging device as well as the apparatus comprise means for the inductive transmission of energy from the charging device to the apparatus.

9. A battery operated apparatus according to claim 1, wherein a feedback from the battery to the node via a step-up transducer is provided.

10. A battery operated apparatus according to claim 1, wherein it is an apparatus from the group which comprises electrical toothcare apparatus, electrical toothbrushes and electrical shaving apparatus.

11. A battery operated apparatus according to claim 1, wherein the voltage essentially has a course as arises with a two-way rectifier procedure and that the frequency lies in the KHz region.

12. A method for operating a battery operated apparatus according to claim 1, wherein the voltage of the electrical energy source in the switched on condition of the first switch means adapts to the charged condition of the battery and the voltage of the electrical energy source in the interruption condition of the first switch means in contrast turns out higher and via the rectifier element charges the capacitor.

13. A method according to claim 12, wherein the switch-on duration of the first switch means exceeds the interruption duration many times.

14. A method according to claim 13, wherein the switch-on duration of the first switch means may last from fractions of seconds up to several seconds, whilst the interruption duration only lies in the order of milliseconds.

* * * * *